United States Patent [19]

Updike

[11] 3,776,275

[45] Dec. 4, 1973

[54] REACTOR BYPASS SYSTEM

[75] Inventor: Stanley H. Updike, Mentor, Ohio

[73] Assignee: TRW Inc., Cleveland, Ohio

[22] Filed: Apr. 10, 1972

[21] Appl. No.: 242,342

[52] U.S. Cl.................. 137/625.4, 60/288, 251/334
[51] Int. Cl............................................. F16k 11/00
[58] Field of Search...................... 137/625.4, 625.5, 137/625.48; 251/333, 334, 362, 361; 60/288

[56] References Cited
UNITED STATES PATENTS

| | | | |
|---|---|---|---|
| 3,097,074 | 7/1963 | Johnson............................ | 60/288 X |
| 3,430,437 | 3/1969 | Saussele et al................. | 137/609 X |
| 2,660,398 | 11/1953 | Bashark............................. | 251/361 |
| 2,192,339 | 3/1940 | Wilson................................ | 251/334 |
| 3,204,930 | 9/1965 | Bredtschneider et al.......... | 251/361 |
| 3,471,123 | 10/1969 | Carlson et al...................... | 251/362 |
| 3,583,426 | 6/1971 | Feres.................................. | 251/333 |
| 3,680,597 | 8/1972 | Obermaier..................... | 137/609 X |

Primary Examiner—Samuel Scott
Attorney—Benjamin H. Sherman et al.

[57] ABSTRACT

A double acting valve assembly, particularly designed for use in conjunction with catalytic reactors of the type employed in internal combustion engine exhaust treatment. The valve assembly includes a housing and a poppet type valve, axially movable within the housing into two positions, in one of which a portion of the valve stem engages a flexible spring washer to flex the same and provides sealing engagement therewith, sealing off one inlet port to the housing. In this one position, a valve head is seated within a valve seat provided within the interior of the housing. In a second position of the valve, another seating face on the valve head is received in seating engagement against a seating ring which is positioned within the housing to provide a self-centering of the valve head against the seat.

12 Claims, 6 Drawing Figures

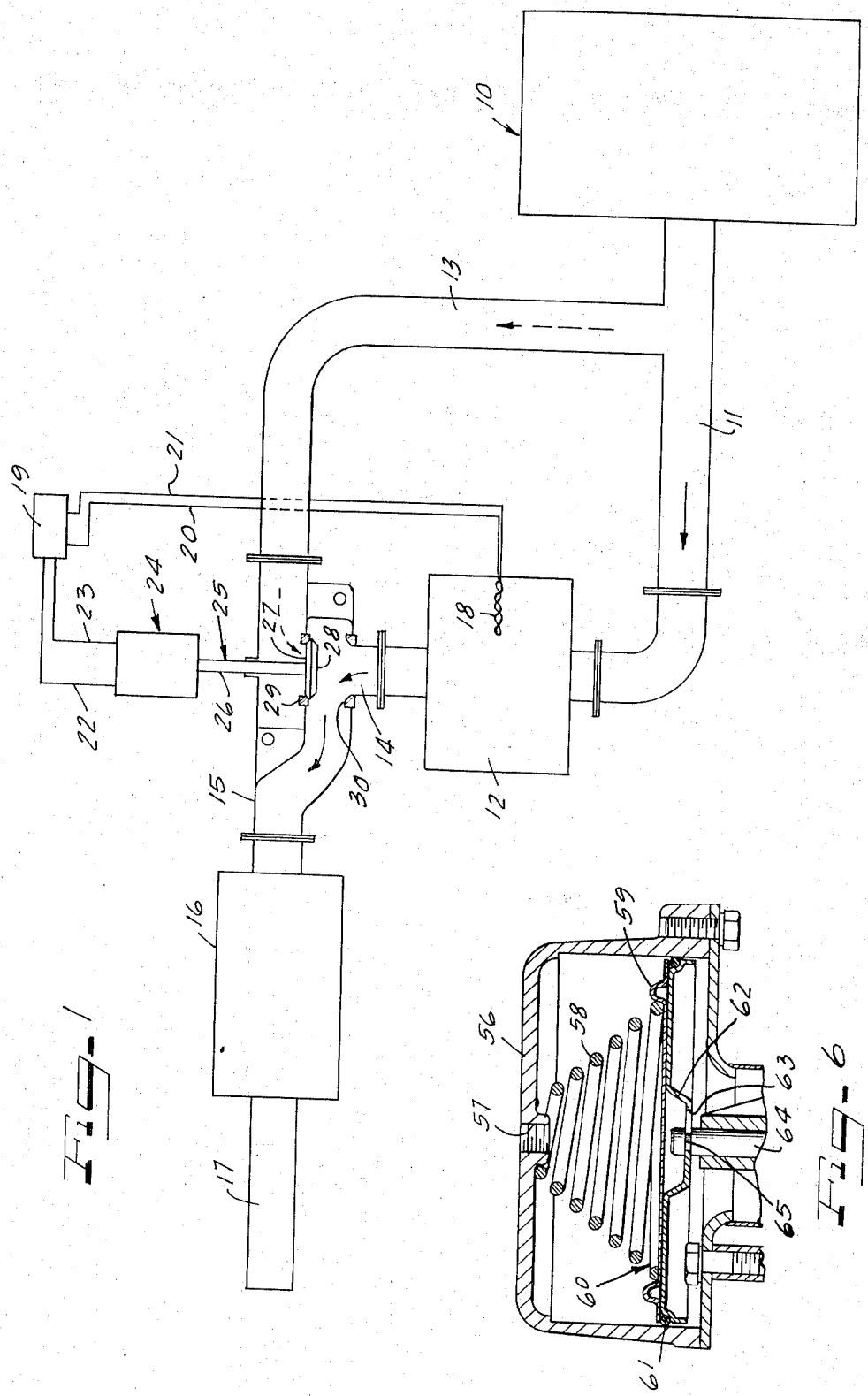

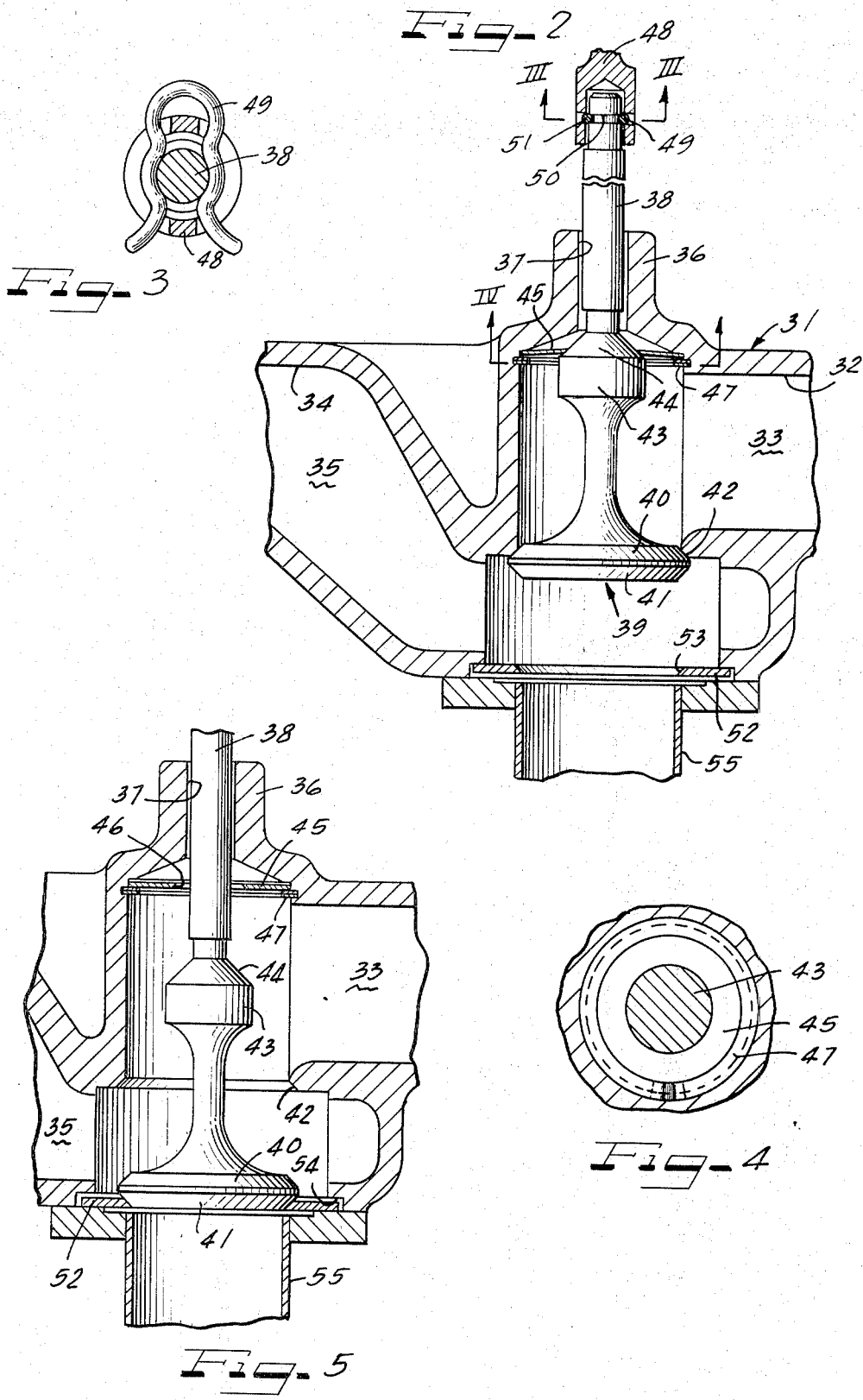

1

REACTOR BYPASS SYSTEM

BACKGROUND OF THE INVENTION

1. Field of the Invention

This invention is in the field of poppet valve assemblies for selectively communicating one of a pair of inlet ports to an outlet port, making use of a poppet valve structure including a double seating face on the headed end thereof and an enlarged stem portion which engages a flexible spring washer in one position of the poppet valve when one of the seating faces on the valve head is engaged with a seat provided in the housing. The second of the valve seating faces is arranged to be seated against a self-centering valve seating ring confined within the housing and axially spaced from the seating face formed in the housing.

2. DESCRIPTION OF THE PRIOR ART

There has been a great deal of research and development work done on catalytic reactor systems for use in conjunction with internal combustion engines to oxidize exhaust by-products. One of the most highly developed catalytic converters presently employed uses a platinum catalyst and normally operates effectively between 1100°F. And 1400°F. During operation of the vehicle, however, raw fuel may pass into the exhaust system from some malfunction such as a choke sticking or engine misfiring. This raw fuel may rapidly oxidize in the catalyst bed, driving the temperatures in the bed in excess of 2000°F. This not only depletes the catalyst bed but endangers the vehicle with a possible fire.

To overcome this difficulty, it has previously been suggested that a bypass system be used to divert exhaust gases around the converter in the event that an over-temperature condition is occurring. This type of system normally uses a temperature sensing means in the catlyst bed which actuates electrical or pneumatic controls to shut off the output from the catalytic converter upon sensing of an abnormally high temperature, and diverting the engine exhaust in this interval directly into the muffler.

The present invention is particularly concerned with a double-acting valve assembly which can be conveniently employed in such an operation to selectively close off the catalytic converter and divert the exhaust products directly into the muffler when an over-temperature condition is sensed. Valve means previously suggested for this type of application frequency employed butterfly-type valves which have a tendency to stick at high temperatures. Furthermore, these valves are frequently expensive to manufacture and require close tolerances.

SUMMARY OF THE INVENTION

The present invention provides a double-acting valve assembly which eliminates many of the objectionable features of valves which have been used in catalytic converter systems at high temperatures. The valve assembly of the present invention makes use of a poppet type valve which can be made of corrosion resistant material. The particular structure employed provides a compact housing and does not require very close tolerances in manufacture. Means are also provided to prevent sticking in the valve guide area and the valve system is compatible with both solenoid and vacuum type actuators. Means are also provided for connecting the actuator to the valve stem under conditions minimizing the amount of heat transfer.

In the preferred embodiment of the present invention, I provide a valve assembly which includes a housing and a valve stem guide formed in the housing. A valve member having a stem portion slidably received within the valve stem guide also has a head portion having a pair of valve seating faces thereon. One valve seating face is arranged to be seated against a valve seat provided in the housing itself in one position of the valve stem. In this position, an enlarged portion of the valve stem engages a spring-type washer element to flex the same into sealing engagement therewith, thereby blocking off the bypass line from the exhaust. In another position of the valve, the second seating face on the valve head engages a valve seating ring which has a self-centering feature to provide accurate seating of the valve face therein.

BRIEF DESCRIPTION OF THE DRAWINGS

FIG. 1 is a somewhat schematic view of an internal combustion engine exhaust system employing a bypass valve according to the present invention;

FIG. 2 is a fragmentary view in cross-section, and partly in elevation, of the valve assembly under normal operating conditions, that is, when the exhaust gases are being passed from the catalytic converter to the muffler;

FIG. 3 is a cross-sectional view taken substantially along the line III—III of FIG. 2;

FIG. 4 is a cross-sectional view taken substantially along the line IV—IV of FIG. 2;

FIG. 5 is a view similar to FIG. 2, but illustrating the valve in the other position, when it is bypassing exhaust gases directly into the muffler; and FIG. 6 is a fragmentary cross-sectional view of a pneumatic type actuator which can be employed with the valve assemblies of the present invention.

DESCRIPTION OF THE PREFERRED EMBODIMENTS

In FIG. 1, reference numeral 10 indicates generally a portion of the engine exhaust system, such as an exhaust manifold which delivers the combustion products of the engine to a pipe 11 leading to a catalytic converter unit 12 and to a bypass pipe 13. In normal operation of the engine, the exhaust gases are passed into the catalytic converter unit 12 where they are passed through a bed of oxidizing catalyst, such as one or more metals or metal oxides which have the capability of converting carbon monoxide and unburned hydrocarbons into carbon dioxide and water. In normal operation, the treated exhaust gases flow in the direction of the solid line arrows and pass through a port 14, into a pipe 15 through an engine muffler 16 and ultimately to the atmosphere through a tail pipe 17.

A temperature sensing element such as a thermocouple 18 is included within the catalytic converter 12. Electrical signals dependent upon the temperature in the catalytic bed are transmitted to a control unit 19 by means of a pair of electrical leads 20 and 21. The control unit 19 is connected by means of leads 22 and 23 to an actuator 24 which may be an electrical actuator such as a solenoid or a pneumatic system either of which is designed to control the location of a valve 25 having a stem portion 26 and a head portion having a pair of valve seating faces 27 and 28, respectively. In the normal operation, the valve face 27 is arranged to be seated against a valve seat generally indicated at reference numeral 29 so that the exhaust gas in the bypass pipe 13 is prevented from entering the muffler 16. When, however, the thermocouple 18 senses a predetermined high temperature in the catalytic bed, indicative of excessive amounts of raw hydrocarbons, a singal from the control unit 19 actuates the actuator 24 to move the valve 25 downward and bring the seating face 28 against the seat 30. In this condition, the exhaust gases can flow through the bypass pipe 13 and into the muffler 16 while the output from the catalytic converter 12 is cut off by the sealing engagement between the valve seating face 28 and the seat 30.

A particularly preferred embodiment of the valve assembly, useful for the purposes of the present invention, is illustrated in FIGS. 2 to 5 of the drawings. In FIG. 2, reference numeral 31 has been applied generally to a housing having an internal bore 32 which provides an inlet port 33 from the exhaust bypass pipe 13 and a bore 34 which provides an outlet port 35 leading to the muffler 16. The housing is also formed with a boss 36 having a bore 37 therethrough which defines a valve stem guide for a stem portion 38 of a poppet valve assembly. As indicated in FIG. 2, a slight clearance can be provided between the wall of the bore 37 and the outer perimeter of the valve stem 38 to minimize the amount of heat transfer occurring between the valve stem and the guide, and to assure free movement of the valve stem 38 in the bore 37.

The poppet valve assembly includes a head portion 39 having formed thereon a pair of valve seating surfaces 40 and 41. Valve seating face 40 is arranged to be seated against a valve seat 42 when the poppet valve is in the position shown in FIG. 2, namely, during normal operation when the exhaust gases are passing from the converter into the muffler. The valve stem 38 has an enlarged portion 43 having a frusto-conical headed portion 44 arranged to be received against a flexible spring washer 45. As best seen in FIG. 5, the washer 45 has a beveled inner periphery 46 which is arranged to be engaged by the frusto-conical portion 44, causing flexing of the spring washer 45 as best illustrated in FIG. 2. The spring washer 45 is retained within the poppet valve passageway by means of a retaining ring 47.

The spring washer 45 seals the valve guide area from the gas pressure in the bypass pipe 13 when the output of the converter is being fed to the muffler. This seal prevents leakage through the guide area which could carry particulate matter or oxidizing gases to cause sticking of the valve in its housing. In order to minimize direct heat conduction from the valve stem 38 to an actuator rod 48, I may employ a hair pin spring 49 to engage a groove 50 in the valve stem 38 by providing a suitable slot 51 in the actuator arm 48 as best illustrated in FIG. 3 of the drawings. This type of attachment avoids an interference interface between the valve and the actuator shaft.

In the position of the valve assembly shown in FIG. 5, that is, the bypass condition where the exhaust gases pass directly to the muffler without going through the converter, the valve seating face 41 is seated against a valve seating ring 52, the latter having a beveled inner periphery 53 as best illustrated in FIG. 2. The ring 52 is loosely received within a recess 54 so that it is capable of a limited amount of axial and radial movement. This permits large stem to guide clearances to be used, which is important for preventing sticking. Since the seat is movable both axially and radially to a limited extent, the ring 52 can center itself with respect to the seating face 41 even with slight misalignment, and thereby close off the input to the valve assembly consisting of gases in the pipe 55 leading from the converter.

One suitable type of actuator mechanism for use with the valve assembly of the present invention is illustrated in FIG. 6 of the drawings. Shown therein is a housing 56 having an internally threaded bore 57 therein arranged to be connected to a suitable source of vacuum. A coil spring 58 has one end bottomed against the upper wall of the housing and its other end received within an annular shoulder 59 which forms part of a piston assembly generally indicated at reference numeral 60. A seal ring 61 is provided to seal the piston assembly against the walls of the housing 56 during reciprocation of the piston. In this particular embodiment, the piston 60 has a recessed portion 62 in which there is formed a keyhole slot 63. A valve stem 64 has a groove 65 therein coupled to the keyhole slot for axial movement of the stem in response to pressure conditions existing within the housing 56. Thus, when a vacuum is applied by means of the actuator 24, the piston 60 will be moved upwardly as shown in FIG. 6 against the bias provided by the spring 58, and thereby seat the enlarged stem portion 44 against the spring washer 45 causing it to flex upwardly as shown in FIG. 2. At the same time, the valve seating face 40 is received in seated engagement against the valve seat 42 in the housing. When an over-temperature condition is sensed, however, the vacuum is no longer applied and the spring 58 urges the piston into the position shown in FIG. 6, whereupon the valve seating face 41 is received against the seat provided by the valve seat ring 52 as shown in FIG. 5. It should be noted that in the event of a failure of the vacuum system, the valve assembly will be automatically seated in the bypass condition, thereby protecting the converter.

From the foregoing, it will be understood that the valve assembly of the present invention provides a positive acting valve mechanism which does not require carefully machined parts or close tolerances being provided.

It will also be evident that various modifications can be made to the described embodiments without departing from the scope of the present invention.

I claim as my invention:

1. A double acting valve assembly comprising a housing, means providing a pair of inlet ports formed in said housing, means providing an outlet port formed in said housing, a first valve seating ring in one of said inlet ports, said first valve seating ring being capable of limited axial and radial movement, a flexible spring-like second valve seating ring associated with the other of said inlet ports, and a valve stem having a headed valve portion arranged to be seated against said first valve seating ring, said valve stem having an enlarged portion axially spaced from said headed valve portion and arranged to be seated in sealing relation against said second valve seating ring upon axial movement of said valve stem, said enlarged portion engaging said second valve seating ring in passing partially therethrough to cause flexing thereof in achieving said sealing relation.

2. The valve assembly of claim 1 in which said housing is fomred with a valve seating face to seat said valve head when said enlarged portion is seated against said second valve seating ring.

3. The valve assembly of claim 1 in which said second valve seating ring is composed of a spring-like material capable of elastic movement upon engagement by said enlarged portion of said valve stem.

4. The valve assembly of claim 1 in which said second valve seating ring has a beveled inner periphery and said enlarged portion has a frusto-conical face thereon arranged to engage said beveled inner periphery.

5. A double acting valve assembly comprising a housing, a valve stem guide formed in said housing, a valve member having a stem portion slidably received within said valve stem guide, a flexible spring washer positioned in said housing in close proximity to said valve stem guide, said valve stem having an enlarged portion thereon arranged to engage and flex said spring washer in sealing engagement therewith in one position of said valve member, said valve member having a head portion having a pair of valve seating faces thereon, said housing having a valve seat formed therein and arranged to seat one of said valve seating faces in said one position, and a valve seating ring confined within said housing and arranged to seat the other of said valve seating faces in a second position of said valve member.

6. The valve assembly of claim 5 in which said valve seating ring is loosely received within said housing to provide limited axial and radial movement therefor.

7. The valve assembly of claim 5 which includes an actuator shaft and a fastening means coupling said actuator shaft to said valve stem while providing radial clearance between the two.

8. The valve assembly of claim 5 in which said spring washer has a beveled inner periphery and said enlarged portion has a frusto-conical portion arranged to engage said beveled inner periphery in sealing engagement.

9. In an internal combustion engine exhaust system including an exhaust manifold, a catalytic converter receiving the exhaust gases from said exhuast manifold, and an exhaust conduit arranged to vent the gases from said converter, the improvement which comprises bypass means connecting said exhaust manifold to said exhaust conduit, a double-acting valve assembly for selectively directing the output of said exhaust manifold to said converter or to said exhaust conduit, said double-acting valve assembly comprising a housing, a first inlet port in said housing connected to said converter, a second inlet port in said housing connected to said bypass means, an outlet port in said housing connected to said bypass means, an outlet port in said housing connected to said exhaust conduit, a valve stem guide formed in said housing, a valve member having a stem portion slidably received within said valve stem guide, a flexible spring washer positioned in said housing in close proximity to said valve stem guide, said valve stem having an enlarged portion thereon arranged to engage and flex said spring washer in sealing engagement therewith in one position of said valve member, said valve member having a head portion having a pair of valve seating faces thereon, said housing having a valve seat formed therein and arranged to seat one of said valve seating faces in said one position, and a valve seating ring confined within said housing and arranged to seat the other of said valve seating faces in a second position of said valve member, and temperature responsive means associated with said converter to move said valve stem axially between the two seating positions of said valve.

10. The exhaust system of claim 9 in which said valve seating ring is loosely received within said housing to provide limited axial and radial movement therefor.

11. The exhaust system of claim 9 which includes an actuator shaft and a fastening means coupling said actuator shaft to said valve stem while providing radial clearance between the two.

12. The exhaust system of claim 9 in which said spring washer has a beveled inner periphery and said enlarged portion has a frusto-conical portion arranged to engage said beveled inner periphery in sealing engagement.

* * * * *